Feb. 18, 1969  W. KÖBNICK  3,428,071
COMPRESSED AIRBRAKE ASSEMBLY
Filed Oct. 31, 1966
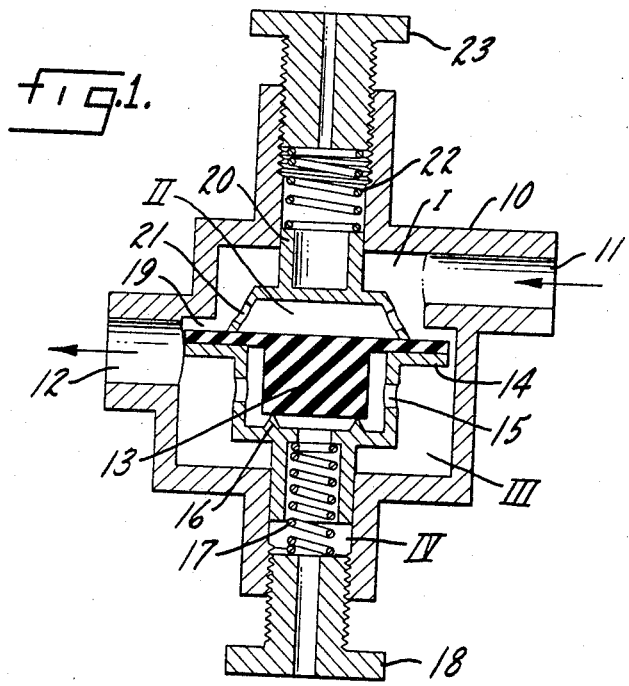
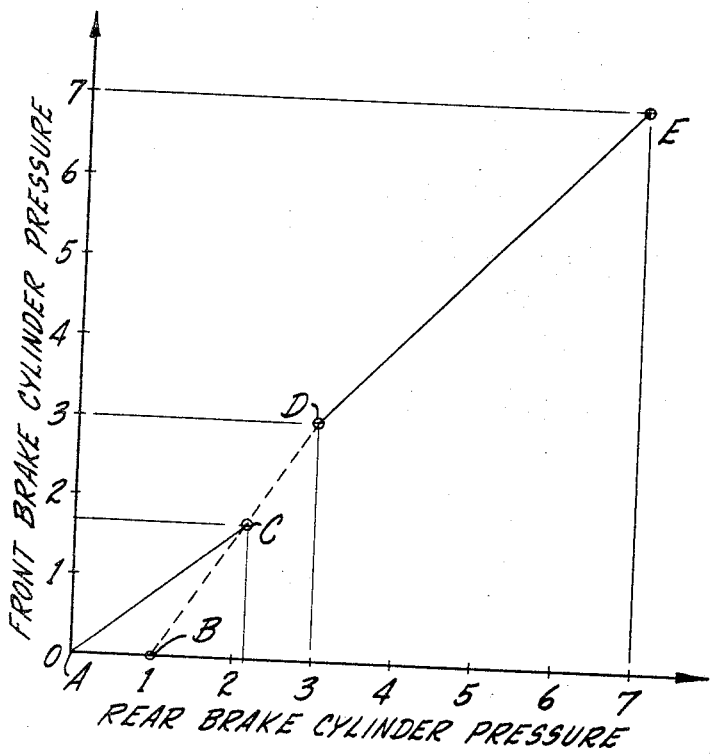
INVENTOR.
Werner Köbnick,
BY Parker & Carter
Attorneys.

United States Patent Office 3,428,071
Patented Feb. 18, 1969

3,428,071
COMPRESSED AIRBRAKE ASSEMBLY
Werner Köbnick, Leimen, near Heidelberg, Germany, assignor to Berg Mfg. & Sales Co., Des Plaines, Ill., a corporation of Illinois
Filed Oct. 31, 1966, Ser. No. 590,616
Claims priority, application Germany, Oct. 3, 1966, B 84,549
U.S. Cl. 137—102    6 Claims
Int. Cl. F16k 17/10, 51/44; B60t 15/12

This invention relates to a compressed airbrake assembly which optionally includes a third brake for a trailer with the front axle brakes thereof braking with a greater strength than its rear axle brakes while the braking pressure impingement is equal, wherein a control valve which is opened when a higher braking pressure is attained is connected to the front axle brakes ahead thereof to thereby achieve lesser braking when operating with lesser braking pressure.

The control valve of a known compressed airbrake assembly of this type is designed so that it opens only from a certain relatively low pressure onward (1 overpressure atmosphere for a two-line brake) and progressively has a reducing effect decreasing as the braking pressure further increases. In a two-line brake, the areas impinged by the pressure as well as the corresponding springs of the valve are dimensioned so that from a braking pressure of about three overpressure atmospheres onward the pressure transmitted to the front axle brake cylinders undergoes no reduction any longer.

In a practical case this signifies that when the third brake is actuated, then initially only the rear axle of the trailer will be braked, and that only when the braking pressure has surpassed about one overpressure atmosphere will the control valve be opened to begin the transmission of the braking pressure to the brake cylinders of the front axle. Thus, especially when driving on very slippery roads, there is danger that the front axle of the trailer will deflect laterally in spite of the stretching effect of the braking which initially takes place at the rear axle. The object of the present invention is to eliminate this disadvantage yet to maintain all advantages of the known system. Hence the invention relates to a compressed airbrake assembly of the type mentioned hereinabove and consists substantially in that from the braking pressure "zero" onward the front axle brake cylinders are in communication via a throttle with the braking pressure outlet of the control valve of the trailer. As will become apparent hereinbelow, this idea applies to one-line brakes as well as to two-line brakes.

In a useful further development of this idea, the throttling means or restriction is formed by the inlet of the control valve, which inlet in the releasing position is opened to an extent which is but a fraction of the maximum opening of its cross-sectional area. In a particularly suitable practical embodiment, it is provided for that from the braking pressure "zero" onward, the valve cone of the control valve—which cone is spring-biased in the closing position of the inlet—is held in an opening position corresponding to the restriction by means of an auxiliary piston under the action of a second spring, against the braking pressure displacing the auxiliary piston against the second spring, within the lowermost range of braking pressure, and in that the second spring and the area of the auxiliary piston that is impinged by the braking pressure are dimensioned so that the auxiliary piston will be displaced so as to be brought out of engagement with the valve cone when the braking pressure lies between "zero" and the value, from which onward the full braking pressure is transmitted through the control valve to the brake cylinders of the front axle.

Further advantages and details of the invention will be apparent from the following description of an exemplary embodiment with reference to the drawing, in which:

FIGURE 1 is a schematic longitudinal sectional view of a control valve for the system according to the invention, and FIGURE 2 is a graph showing the ratio of the braking pressure to the pressure in the front axle brake cylinders in the system according to the invention.

In the braking system for a pneumatically braked trailer of the one-conduit or two-condut type, a conduit leading from the control valve of the trailer—optionally by interposition of a brake force regulator—branches off for feeding the braking cylinders of the rear axle and the braking cylinders of the front axle. Between the ramification and the front brake cylinders, in the known trailers, there is located the quick venting control valve which (the values mentioned hereinafter apply to a two-line compressed airbrake) is closed so long as the braking pressure has not exceeded one overpressure atmosphere so that only the rear axle will be braked when the pressure lies within the range between zero and one overpressure atmosphere. From one overpressure atmosphere upwards, the inlet of the control valve begins to open, and the valve cone of the control valve is impinged in such a manner by the braking pressure resp. a spring acting thereagainst that from a braking pressure of about three overpressure atmospheres onward the valve cone remains in its fully opened position during the further increase of the braking pressure, so that the braking pressures in the brake cylinders of both the front axle and the rear axle are equal to each other. Since the front axle brakes of such a trailer are stronger than its rear axle brakes, the braking effect of the front axle is stronger than the braking effect of the rear axle with the braking pressure impingement being equal. By this feature is utilized the fact that upon vigorous braking, the axle load of the front axle will be greater than that of the rear axle.

The invention improves this known assembly in the sense that at the very beginning of the braking—that is to say, from the braking pressure zero onward, also the front axle brake cylinders will be actuated and that, however, the pressure in the front axle brake cylinders up to about three overpressure atmospheres will be lower than the pressure applied onto the rear axle brake cylinders, i.e., the overall braking pressure, the magnitude of which is determined by the position of the control valve of the trailer and, optionally, of the braking power regulator. According to the invention, from the braking pressure zero onward, the front axle brake cylinders communicate with the control valve of the trailer via a throttle. The schematic view in FIGURE 2 elucidates these interrelations. At the abscissa is shown the pressure in the rear brake cylinders, which corresponds to the braking pressure determined by the control valve of the trailer. At the ordinate is shown the pressure in the front brake cylinders. Between the points D and E, both pressures are equal. This range extends from about three overpressure atmospheres up to the peak pressure and corresponds to the pressure range commensurate to the normal operation of the service brake, especially when powerful brakes are involved. In the known compressed air braking systems of the type mentioned in the introduction to this specification, the control valve is dimensioned so that a characteristic with the trace A–B–D is achieved for the braking pressure range of from zero to three overpressure atmospheres. Hence it follows that the front axle brake cylinders are impinged by pressure only when the overall brake pressure has already reached 1 overpressure atmosphere. With the aid of the invention, the characteristic of the compressed airbrake system of the trailer is brought onto the continuous line A–C–D–E. It is evident that up to point D, the braking pressure of the front axle brake cylinders is lower than the overall brake pressure, which circumstance is important for the safe stretching of the trailer train when the third brake is actuated; however, it is also clear that notwithstanding this circumstance, also the braking at the front axle takes place from the very beginning of the braking operation.

In detail, this advantageous brake behaviour can be achieved in that the control valve is designed according to, e.g., FIGURE 1. The housing 10 includes the known braking pressure connection line 11 and the connection line 12 for the front brake cylinders. The braking pressure acts on the valve cone 13, 14 against the force of the spring 17 and thus opens the inlet 19. The strength of the spring 17 and the valve cone area impinged by the braking pressure determine the position of the point B in the diagram according to FIGURE 2. The valve cone consists of a pot-like member 14 having a diaphragm 13 which extends in the fashion of a pot-lid above the opening of the pot and which projects with a cylindrical lug downwardly into the pot 14 so that its underside together with an annular projection defines the outlet 16. The pot 14 has lateral holes 15. Thus, the space III is in communication with the annular intermediate space between the cylindrical walls of the pot 14 and the rubber diaphragm via the holes 15. Thus, when the braking pressure in the connecting sleeve 11 drops considerably—which corresponds to the releasing of the brakes—then the pressure from the front axle brake cylinders, which propagates from the sleeve 12 through the space III and the bores 15 in the intermediate space within the pot, raises the resilient diaphragm 13 upwardly so that the outlet 16 opens and the brake cylinders of the front axle are evacuated through the space IV. The screw 18 which permits the adjustment of the bias of the spring 17 and hence the determination of point B (as is the case with the known brake assembly) has an axial vent hole which blows off the air flowing from the brake cylinders. Thus far, the control valve is state of art.

Now, according to the present invention, there is provided an auxiliary piston 20 which, under the force of a second spring 22, displaces the valve cone in the releasing position—that is to say, the main piston of the valve, consisting of parts 13 and 14—so far in the sense of opening of the inlet 19 against the spring 17 thereof that the only a little opened inlet constitutes a throttle or restriction. The auxiliary piston 20 is bell- or cup-shaped at its lower end, while the space beneath the cup—i.e., the space II—is in communication with the space I, i.e., the braking pressure, via lateral openings 21 in the cup. The bias of the second spring 22 is adjustable with the aid of a screw 23 having a longitudinal vent hole therethrough. The cross section of the sideway or guideway of the auxiliary piston 20 within the housing is the surface, upon which the braking pressure acts and urges the auxiliary piston against the resistance of the spring 22 to thereby displace the auxiliary piston and bring it out of engagement with the main piston.

The mode of operation of the valve according to FIGURE 1 is as follows: in FIGURE 1 is shown the valve in the releasing position, i.e., the brake pressure corresponds to the atmospheric pressure. At a given working surface of the braking pressure on the auxiliary piston 20, the spring 22 is now adjusted in such a manner by means of the screw 23 that in the releasing position the auxiliary piston 20 will force the main piston—which consists of the diaphragm 13 and the pot 14—somewhat downwardly so that in the mode shown the inlet 19 is only a little opened and thus forms a restriction or throttle. Hence even a small increase of the braking pressure already—especially when the third brake is operated—lets the braking pressure further propagate through the throttle into the front brake cylinders. As the braking pressure increases, the spring 22 will be compressed since the braking pressure pushes the piston 20 upwardly. From this moment henceforth the valve operates exactly as the control valve of the known braking system: at first there are possible various equilibrium conditions of the braking pressure and the pressure in the front brake cylinders—up to a braking pressure of about three overpressure atmospheres—i.e. (see FIGURE 2) the operation of the valve takes place between the points C and D. From point D onward, the braking pressure impinging the effective areas of the main piston is so high that the inlet 19 is fully opened and no pressure reduction takes place any longer. When the braking pressure decreases, the inlet 19 will be closed because the main piston is upwardly displaced by the pressure in the front brake cylinders and by the spring 17, while the auxiliary piston 20 initially remains in the upraised position because the braking pressure which has not yet dropped to zero can still compress the spring 22. The front brake cylinders are relieved from air in that the pressure prevailing in the front brake cylinders raises the diaphragm 13 and hence opens the outlet 16. When the braking pressure has decreased to zero, then the front brake cylinders are relieved from the air and the spring 22 urges the auxiliary piston 20 again downwardly in such a manner that the inlet 19 is slightly opened. In this manner it provides the throttle for the subsequent operative cycle anew.

All of the details represented hereinabove are relevant for the invention.

There is claimed:

1. For use in a vehicle airbrake system, a valve including a housing, an air pressure inlet in said housing, an air pressure outlet in said housing, a valve seat in said housing between said inlet and said outlet, a valve member movable in said housing toward and away from said seat, said valve member being movable away from said seat in response to pressure entering said inlet, a first yielding means positioned in said housing to urge said valve member toward said seat, a valve actuator movable in said housing toward and away from said valve member, a second yielding means positioned in said housing to urge said actuator toward said valve member to unseat said valve member.

2. The structure of claim 1 characterized by and including a surface on said actuator exposed to said pressure entering said inlet whereby said actuator is urged by said pressure against the action of said second yielding means.

3. The structure of claim 1 wherein said first and second yielding means are of varying forces so related as to cause said actuator to move said valve a limited distance off said seat.

4. The structure of claim 1 wherein said valve member includes a piston portion, a flexible element carried by said piston portion, an exhaust passage formed in said piston portion, said flexible element including a portion closing said exhaust passage, said flexible element being movable in response to pressure entering said housing from said inlet.

5. The structure of claim 4 wherein said flexible element includes an annular portion positioned for seating on said seat and an axial projection positioned to open and close said exhaust passage.

6. The structure of claim 1 wherein said actuator includes a cup-shaped portion having its rim engageable with said valve member and a plurality of circumferentially spaced apertures in said cup-shaped portion communicating the area within said portion with said inlet.

References Cited

UNITED STATES PATENTS 2,049,984  7/1936  Vorech _____ 303—29 XR
2,922,678  1/1960  Schultz _____ 303—29

WILLIAM F. O'DEA, *Primary Examiner.*

WILLIAM H. WRIGHT, *Assistant Examiner.*

U.S. Cl. X.R.

137—115, 522; 251—82; 303—6, 7, 29